Figure 1:
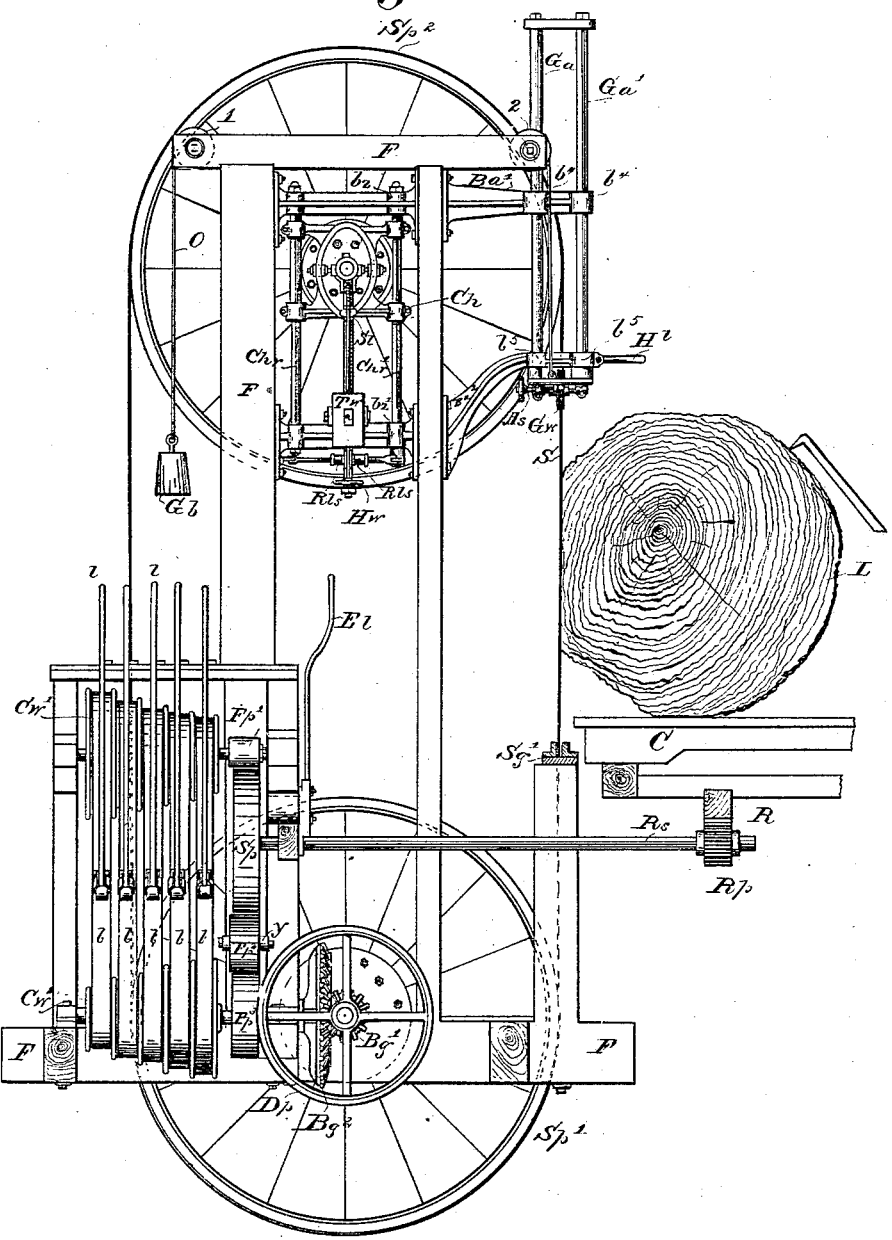

(No Model.) 3 Sheets—Sheet 1.

H. W. GROVES.
PORTABLE BAND SAW MILL.

No. 278,936. Patented June 5, 1883.

WITNESSES.
Jacob W. Loeper
W. P. Smith

INVENTOR.
Henry W. Groves
By C. P. Jacobs
Atty.

N. PETERS. Photo-Lithographer. Washington. D. C.

(No Model.) 3 Sheets—Sheet 2.
H. W. GROVES.
PORTABLE BAND SAW MILL.
No. 278,936. Patented June 5, 1883.
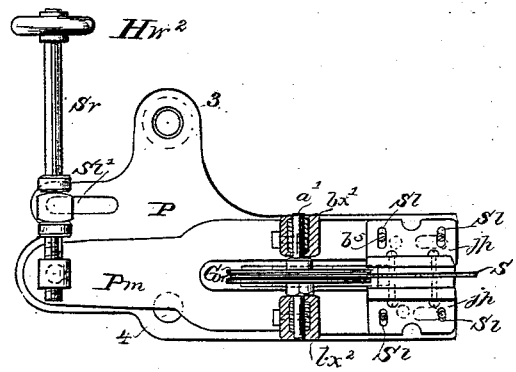
Fig. 2.
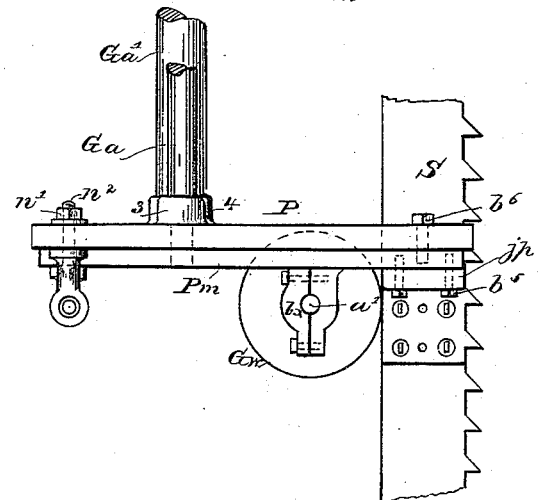
Fig. 5.
Fig. 3.
Fig. 6.
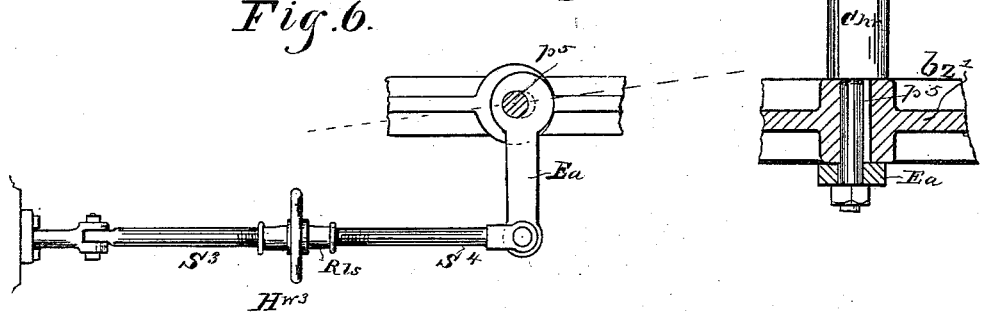
WITNESSES.
Jacob W. Loeper
W. P. Smith
INVENTOR.
Henry W. Groves
By C. P. Jacobs
Atty.

(No Model.) 3 Sheets—Sheet 3.
H. W. GROVES.
PORTABLE BAND SAW MILL.
No. 278,936. Patented June 5, 1883.
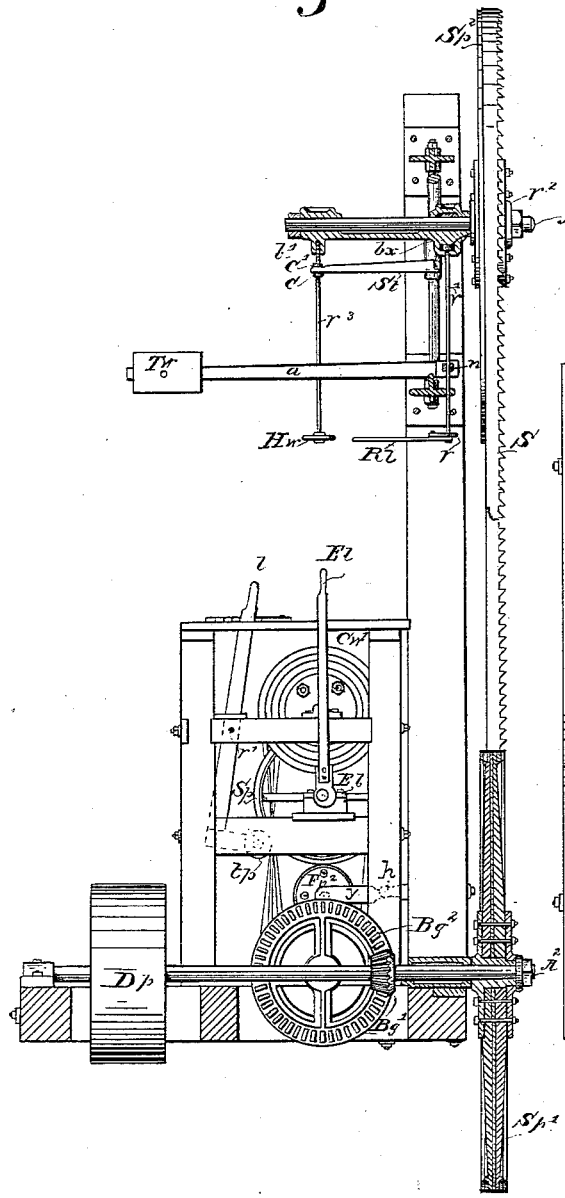
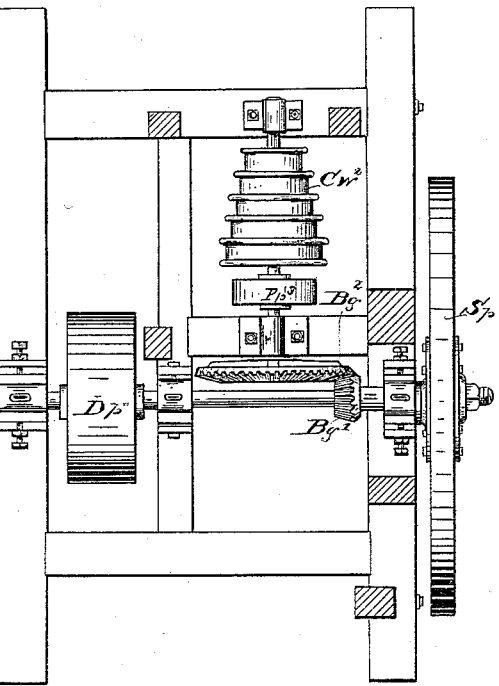
WITNESSES.
INVENTOR.

UNITED STATES PATENT OFFICE.

HENRY W. GROVES, OF INDIANAPOLIS, INDIANA, ASSIGNOR OF ONE-HALF TO SINKER, DAVIS & COMPANY, OF INDIANA.

PORTABLE BAND SAW MILL.

SPECIFICATION forming part of Letters Patent No. 278,936, dated June 5, 1883.

Application filed March 12, 1883. (No model.)

*To all whom it may concern:*

Be it known that I, HENRY W. GROVES, of Indianapolis, Marion county, Indiana, have invented a new and useful Improvement in Portable Band Saw Mills, of which the following is a description, reference being made to the accompanying drawings, (three sheets,) in the several figures of which like letters indicate like parts.

My invention relates to that class of lumber-mills which operate by means of band-saws; and my object is to provide a saw-mill which shall be portable and not require to be permanently attached to a building.

In the drawings, Figure 1 is a side view of my invention; Fig. 2, the detail of the adjustable guide, on an enlarged scale, a bottom view; Fig. 3, a vertical section of the lower saw-pulley and the axis of the upper one and a part of the frame to show how the saw-pulley is constructed, and the tightening and adjusting mechanism of the upper pulley; Fig. 4, a top view of the lower part of the frame and driving mechanism; Fig. 5, a side view, on an enlarged scale, of an adjusting device to keep the saw in proper place on the wheel; and Fig. 6 is an enlarged view of the eccentric tightening device. Fig. 7 is an enlarged view of the same eccentric, and will be hereinafter explained.

In detail, F F is the frame-work of the machine; $Dp$, the driving-pulley, mounted on the same axis, $A^2$, as the lower saw-pulley, $Sp'$, which axis also carries the bevel-wheel $Bg'$, set to engage with the bevel-wheel $Bg^2$ at right angles, the axis of the latter being that of the lower friction-pulley, $Fp^3$, and the lower cone-wheel, $Cw^2$. This cone-wheel, like its fellow, the upper cone-wheel, $Cw'$, has a separate flange for each section, and the two wheels are connected by a series of separate belts, $b$ $b$ $b$, the cone-wheels being reversed in position in relation to each other, and the belts are prevented by the flanges from slipping off, as shown in Fig. 1. The bands on these wheels are tightened by means of a series of levers, $l$, which hang upon a rod, $r'$, Fig. 3, and have an arm which is connected with a tightening-pulley, $tp$. (Shown in dotted lines, Fig. 3.) On the axis of the cone-wheel $Cw'$ is mounted a friction-pulley, $Fp'$, below which is a shifting friction-pulley, $Sp$, mounted on the end of the axis $Rs$ of the rack-pinion $Rp$, which engages with the rack R, underneath the log-carriage C, on which the log L rests.

$El$ is an eccentric or reverse lever having an eccentric boxing, $Eb$, by means of which lever the shifting-pulley $Sp$ can be crowded against the friction-pulley $Fp'$, and the intermediate friction-pulley, $Fp^2$, which works on a hinge, $h$, Fig. 3, in a yoke $y$.

Upon the axis $A'$ of the saw-pulley $Sp^2$ is fixed a cross-head, $Ch$, which is adjustable up and down on its frame $Chr$ by means of the ratchet-lever $Rl$, having a ratchet, $r$, and which is attached to a rod, $r'$, which is threaded to engage with a nut, $n$, in the end of the lever-arm $a$. On the end of this lever is a tension-weight $Tw$, which serves to keep the cross-head and its axis and the saw-pulley $Sp^2$ up close against the saw. The end of this rod $r'$ works in a nut or collar, $r^2$, fitted in a projection in the long boxing $bx$, and when the ratchet-lever is turned the rod $r'$ forces the boxing $bx$ upward or downward, as desired, the object of this device being to carry the cross-head and saw-pulley up or down together to tighten or loosen the saw. A further adjustment, by means of which the saw-pulley $Sp^2$ may be thrown outward or inward whenever necessary to bring the two saw-pulleys in line with each other, is provided for by the rod $r^3$, at one end of which is the hand-wheel $Hw$, and whose other end, $b'$, is screwed firmly into a boss or projection in the boxing $bx$. Collars $c$ $c'$ are also provided, between which is the end of a brace or stay rod, $St$, the other end of which is firmly attached to or made integral with the cross-head.

The bracket-arms $Ba'$ and $Ba^2$, bolted to the frame, are formed with boxings $b^4$ $b^5$, through which pass the guide-arms $Ga$ $Ga'$, the lower outer boxing, $b^5$, being made so it can be tightened or loosened or clamped by the hand-lever $Hl$. These guide-arms can be moved up and down so as to adjust the working part of the saw to the diameter of the log on the carriage.

The guide balance-weight Gb is attached to a rope, O, which passes over pulleys 1 and 2 and down, and is fastened in a staple upon the guide, as shown in Fig. 1. This weight balances the weight of the guide-frame, so that it may be readily moved up and down, and when it is in proper position it is tightened and held by means of the hand-lever Hl.

In Fig. 2 I illustrate my adjustable guide, which is screwed to the guide-arms Ga Ga'. Lugs 3 and 4 in the base-plate P are threaded, and the ends of the guide-arms are tapped to fit them. (See Fig. 5.) Sl' is a slot in the plate P, through which a bolt, $n^2$, passes, having a nut, n'. This slot is to allow the movable plate Pm to be moved in the direction of its length. This plate Pm has lugs for boxing attached, bx' $bx^2$, in which the axis a' of the grooved wheel Gw has bearings. A side view of this is shown in Fig. 5. This wheel Gw is grooved in the center, so as to allow the back edge of the saw to fit into its groove, and by loosening the nut n' the whole plate Pm, with the grooved wheel Gw, may be crowded up against the back of the saw, and the saw be thus forced outward whenever desired. This is valuable whenever the saw needs adjusting, so as to bring its cutting-edge close to the log. The plate Pm and wheel Gw are capable also of a lateral adjustment by means of the screw-rod Sr and its hand-wheel $Hw^2$. The slots Sl Sl are formed in the jaw-plates jp of the guides, and taps $b^5$, which enter the plate Pm, as shown in Fig. 5, pass through these slots, and of course a lateral movement of these taps and the plate Pm, into which they are screwed, is allowed to the length of the slot Sl. This adjustment is necessary whenever the saw runs crooked in the log.

In Fig. 6 is a detail, upon an enlarged scale, of the adjusting device, by means of which the right-hand side of the cross-head is thrown in or out. This is accomplished by means of a hand-wheel, $Hw^3$, operating a right-and-left socket, Rls, into which enter the threaded ends of the rods $S^3$ and $S^4$, the latter having an eccentric-arm, Ea, which is keyed upon a pin, $p^5$, eccentrically turned upon the end of the standard Chr, so as to give an eccentric movement to the latter, and to provide room for this without cramping, the boxes bz and bz' are a little elongated, all of which is illustrated in Fig. 7, which is drawn on an enlarged scale.

The saw-pulleys Sp' and $Sp^2$ are made of solid wedge-shaped sections of wood, the grain running from the center toward the circumference. The lower wheel is made of three and the upper one of two thicknesses of wood to each section. These are all glued together and turned up and fitted into an iron hub formed of two parts, an inner flange having a boxing, and an outer flange, and these flanges are bolted together through the wheel, as shown in cross-section, Fig. 3. The periphery is coated with gum. The wheel being solid, instead of being formed with openings, presents less resistance to the air, and can be run at a higher rate of speed. It also makes the wheel firmer, and it has less vibration. It will not shrink or warp as readily as though the grain ran in the direction it does on ordinary pulleys, and the saw will run straighter, more even, and do faster and better work than saws run on pulleys now in use.

The operation of my machine will doubtless be readily understood from the drawings and the explanation already given.

The frame-work is constructed of strong timbers carefully put together, and is adapted to be taken up and set down again—that is, it is portable—with little difficulty. The power is of course applied by means of an ordinary belt connecting the driving-pulley Dp with a pulley on the engine.

What I claim, and desire to secure by Letters Patent, is the following:

1. In a band saw mill, the portable frame F F, in combination with the solid saw-pulleys Sp' $Sp^2$, the saw S, the guide frame and arms, the cone-wheels Cw' $Cw^2$ and their belt-tightening mechanism, and means for actuating the same, substantially as described.

2. In a band saw mill, a portable frame sustaining the driving mechanism, and an upper saw-pulley, whose axle revolves in an adjustable boxing, in combination with a saw, guide-arms, and an adjustable guide connected therewith, whose vertical movement is regulated by a counter-balance and its horizontal movement by a wheel and set-screw, substantially as described.

3. In a band saw mill, a movable cross-head mounted on the extended axle of the upper saw-pulley, and moving vertically up and down on a frame whose right-hand guide-rod is adapted to rotate in elongated boxings bz bz' of the cross-arms, and is connected to an eccentric adjusting device, whereby that standard of the cross-head may be thrown in or out and the run of the saw changed on the saw-pulley, substantially as and for the purpose described.

4. An eccentric adjusting device attached to the lower end of the right-hand standard of a cross-head frame, whereby the standard may be thrown in or out, substantially as and for the purpose described.

5. In a band saw mill, an upper saw-pulley whose axle works in a boxing connected with a movable cross-head, and capable of an adjustment at a point between the cross-head and the saw-pulley by means of a rod operating directly upon the boxing of the shaft next to the saw-pulley, and actuated by a lever working at right angles to the rod, the rod being parallel with the sides of the saw-pulley, whereby the saw-pulley and axle may be lifted and the saw tightened by raising and loosened by lowering the same, substantially as described.

6. In a band saw mill, an upper saw-pulley whose axle works in an elongated boxing connected with a movable cross-head, and adapted to be adjusted at the end farthest from the saw-pulley by means of a screw-rod working in a nut formed on the under side of the boxing, at a point outside the cross-head and near the end of the axle, whereby the saw-pulley may be thrown outward by raising and dropped inward by lowering the end of the axle, substantially as described.

7. In a band saw mill, an adjustable guide attached to the lower ends of the guide-rods, wherein a grooved wheel revolves on bearings in journals fixed to a movable plate, P$m$, which is so connected underneath a base-plate, P, rigidly attached to the ends of the guide-rods G$a$ and G$a'$, that the former, with its grooved wheel, is adjustable from and toward the back edge of the saw in a line at right angles to the axis of the wheel, substantially as described.

8. In a band saw mill, an adjustable guide attached to the lower ends of the guide-arms, wherein a wheel having a circumferential groove to receive the back edge of a band-saw revolves on bearings connected with a movable plate which is capable of an adjustment in the line of the axis of the wheel for straightening the cut of the saw in the log, substantially as described.

9. An adjustable guide for a band-saw, attached to the lower ends of the guide-arms, wherein a wheel having a central groove for receiving the back edge of the saw revolves on bearings attached to a movable plate so connected underneath a base-plate as to be adjustable, by means of a screw-rod at the end farthest from the saw, in a line with the axis of the grooved wheel, substantially as described.

10. In an adjustable saw-guide, the combination of a base-plate, P, slotted to admit a wheel, G$w$, having a circumferential groove, and a band-saw, S, a movable plate, P$m$, connected therewith by means of a stay-nut, the movable plate having bearings for the axis of the grooved wheel G$w$, slotted jaw-plates $jp$, bolted to the movable plate, and susceptible of adjustment thereon by means of set-screws working in slots, the screw-rod S$r$, and its hand-wheel, substantially as and for the purpose described.

In witness whereof I have hereunto set my hand this 27th day of February, 1883.

H. W. GROVES.

Witnesses:
C. P. JACOBS,
JACOB W. LOESSER.